US007227732B2

(12) United States Patent
Wang

(10) Patent No.: US 7,227,732 B2
(45) Date of Patent: Jun. 5, 2007

(54) APPARATUS AND METHOD FOR CONTROLLING OPEN/CLOSE TIMING OF RELAY

(76) Inventor: Chu-Li Wang, 7F, No. 219, Nanking East Road, Sec. 3, Taipei (TW)

( * ) Notice: Subject to any disclaimer, the term of this patent is extended or adjusted under 35 U.S.C. 154(b) by 76 days.

(21) Appl. No.: 11/159,185

(22) Filed: Jun. 23, 2005

(65) Prior Publication Data

US 2006/0291119 A1 Dec. 28, 2006

(51) Int. Cl.

*H02H 3/08* (2006.01)
*H02H 9/02* (2006.01)
*H02H 3/00* (2006.01)
*H02H 7/00* (2006.01)

(52) U.S. Cl. ........................................ 361/93.1; 361/3

(58) Field of Classification Search ............... 361/93.1, 361/3

See application file for complete search history.

(56) References Cited

U.S. PATENT DOCUMENTS 6,768,615 B2 * 7/2004 Liu ............................... 361/2
6,903,554 B2 * 6/2005 Wilson et al. .............. 324/418

* cited by examiner

*Primary Examiner*—Stephen W. Jackson
*Assistant Examiner*—Dharti H. Patel

(57) ABSTRACT

A method and an apparatus measure an actual responsive time for a relay and control the open/close timing for the relay. The apparatus comprises a microprocessor and two conversion units. One conversion unit processes an input sinusoidal signal for the microprocessor and the microprocessor sends a control signal to energize or de-energize a coil of the relay at an arbitrary time point. Another conversion unit senses a waveform change after the switch of the relay and sends a state signal to the microprocessor. Therefore, the microprocessor can obtain an actual responsive time of the relay by the difference between the control signal and the state signal. The microprocessor will apply next control signal with a time lead of the responsive time before next zero-crossing point to achieve zero-crossing switch for the relay.

12 Claims, 3 Drawing Sheets

APPARATUS AND METHOD FOR CONTROLLING OPEN/CLOSE TIMING OF RELAY

BACKGROUND OF THE INVENTION

1. Field of the Invention

The present invention relates to an apparatus and a method for controlling open/close timing of relay, especially to an apparatus and a method for switching a relay precisely at predetermined time points.

2. Description of Prior Art

As is well known, one use for relays is the delaying of signal connections to prevent a sudden current overload, generated by abrupt power switch on or switch off, from inputting into circuits of appliances. Relays are also used to connect to loads to cut out sudden large currents, caused by improper operation or control, for protecting the appliances from burning out.

Therefore, the relay is extensively used for switch control of electrical circuits. The relay generally comprises a coil and at least one contact controlled by the coil. More particularly, the contacts are switched between a close state and an open state in response to an energization and a de-energization of the coil.

Spark may be present when the contacts are switched with a load current. The contact resistance of the contact will be increased by the spark. Moreover, the contacts may be damaged earlier than expected by the spark. To ensure the lifetime of relay, the relay for alternative current operation is preferably switched at a zero-crossing point to prevent spark generation.

A time difference is inevitably present between the coil action and the contact opening/closing operation. The time difference between the coil action and the contact opening operation is referred to as an open time; and the time difference between the coil action and the contact closing operation is referred to as a close time. The open time and the close time may be the same or be different, and are generically referred to as responding time. The responding time can be known from the specification provided by manufacturer. However, the responding time may be drifted with operation time, temperature change and aging of the relay. Moreover, the responding time is also different for different manufacturer.

To switch the relay at zero-crossing point, relay controller such as a relay accelerator is developed to speed up the switch operation. However, the responding time cannot be minimized to zero and the zero-crossing point operation is still not realized.

U.S. Pat. No. 6,768,615 disclosed a relay controller with a memory unit. The responding time is pre-stored in the memory unit and the relay controller sends a control signal in advance to the zero-crossing point according to the pre-stored responding time for compensating the responding time. However, the relay controller relies on the specification provided by manufacturer and still cannot account for the practical factors such as operation time, temperature change and aging of the relay. For example, if the responding time is 5 ms according to the specification of manufacturer and is stored in the memory unit, the relay controller will generate the control signal with reference to the 5 ms responding time. However, the responding time may be changed to 10 ms due to above-mentioned practical factors, the zero-crossing operation still cannot be achieved.

SUMMARY OF THE INVENTION

The present invention is intended to provide an apparatus and a method for measuring an actual responding time for compensating the control signal, thus switching a relay precisely at predetermined time points.

The present invention is also intended to provide an apparatus and a method for switching a relay precisely at predetermined time points independent of practical factors such as operation time, temperature change and aging of the relay.

Accordingly, the present invention provides an apparatus for switching a relay precisely at predetermined time points. The apparatus comprises a microprocessor and two conversion units connected between a hot line and a ground line of an alternative current (AC) power source. One conversion unit processes an input sinusoidal signal for the microprocessor and the microprocessor sends a control signal to energize or de-energize a coil of the relay at an arbitrary time point. Another conversion unit senses a waveform change after the switch of the relay and sends a state signal to the microprocessor. Therefore, the microprocessor can obtain an actual responding time of the relay by the difference between the control signal and the state signal. The microprocessor will apply next control signal with a time lead of the responding time before next zero-crossing point to achieve zero-crossing switch for the relay.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1:
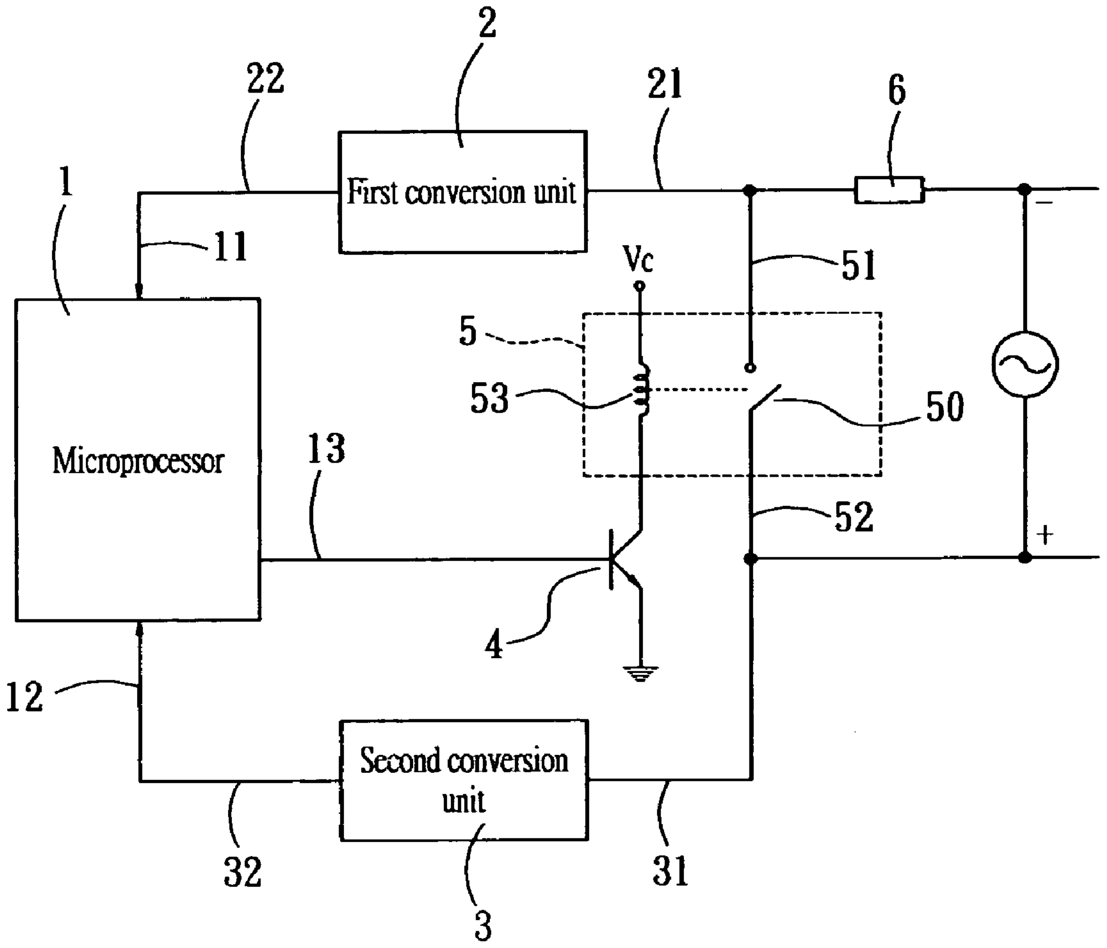
FIG. 1 shows a block diagram of the apparatus for controlling open/close timing of relay according to the present invention.

FIG. 1 shows a block diagram of the apparatus for controlling open/close timing of relay according to the present invention. The apparatus according to the present invention comprises a microprocessor 1 for controlling the overall operation. The microprocessor 1 comprises two signal input ends 11 and 12 connected to a first conversion unit 2 and a second conversion unit 3, respectively. The microprocessor 1 further comprises a signal output end 13 connected to a control end of an electronic switch, such as a base of a transistor 4. The collector of the transistor 4 is connected to a coil 53 of the relay 5 to energize and de-energize the coil 53. The switch 50 of the relay 5 will have close/open operation in response to the energization and the de-energization of the coil 53.

The switch 50 is controlled by the relay 5 and comprises at least two contacts such as a first contact 51 and a second contact 52. The first contact 51 is connected to one end of a load 6 and an input end of the first conversion unit 2. Another end of the load 6 is connected to a ground line of an AC power source. The second contact 52 of the relay 5 is connected to an input end 31 of the second conversion unit 3 and a hot line of the AC power source. Output ends 22, 32 of the first conversion unit 2 and the second conversion unit 3 are connected to input ends 11, 12 of the microprocessor 1, respectively. The first conversion unit 2 and the second conversion unit 3 are functioned to convert an input sinusoid signal to an output pulse signal.

Figure 2:
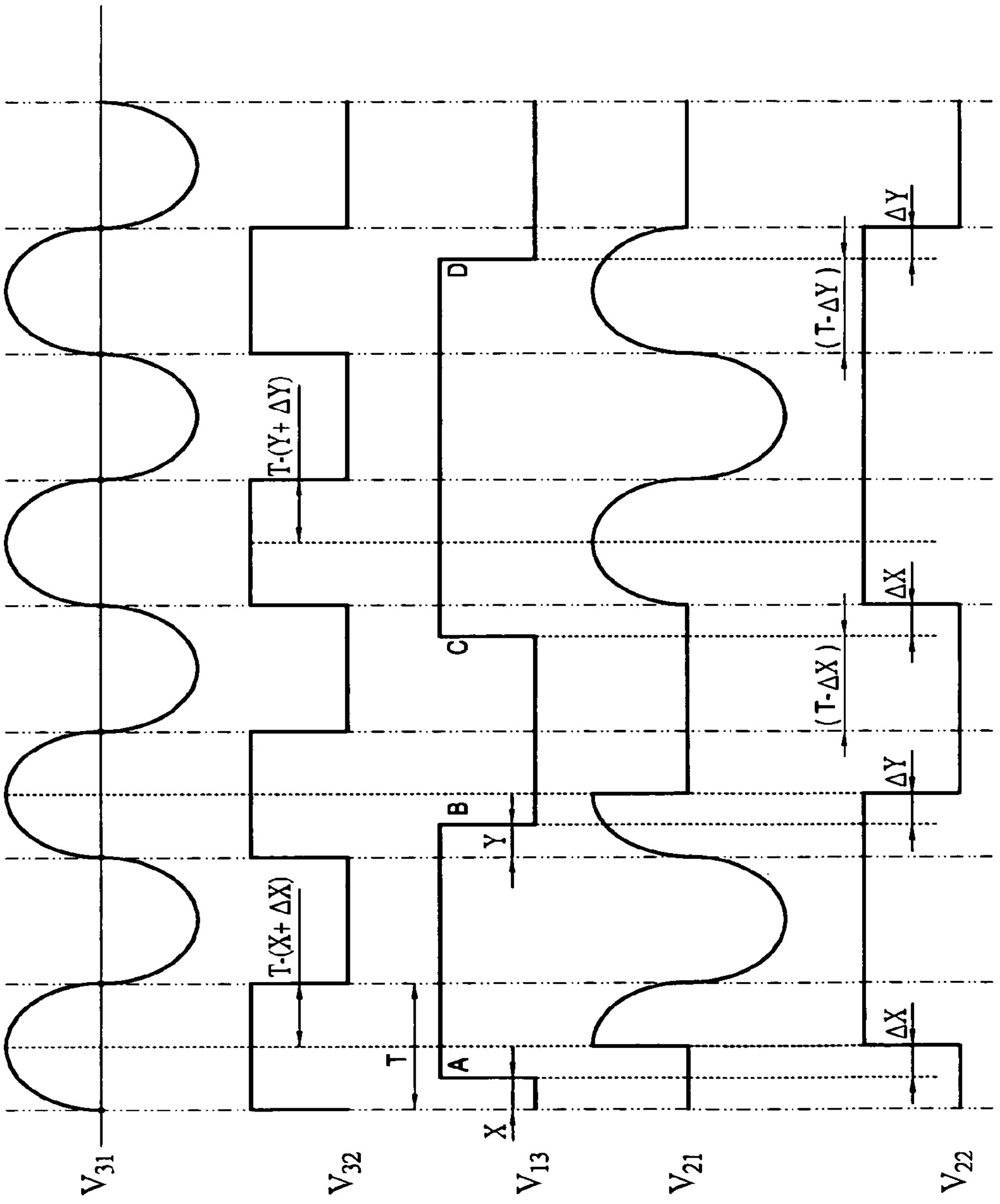
FIG. 2 shows operational waveforms of the apparatus for controlling open/close timing of relay according to the present invention.

FIG. 2 shows operational waveforms of the apparatus for controlling open/close timing of relay according to the present invention. The second conversion unit 3 converts an input sinusoid signal $V_{31}$ of the AC power source to an output pulse signal $V_{32}$ when the switch 53 is opened (no matter the coil 53 is in energization or de-energization state). Moreover, the second conversion unit 3 then sends the pulse signal $V_{32}$ to the microprocessor 1. Therefore, the microprocessor 1 will know each zero-crossing point in the sinusoid signal $V_{31}$ of the AC power source. Provided that the microprocessor 1 sends a control signal (waveform with rising edge A in the signal $V_{13}$) at a specific time point with a time lag X to a previous zero-crossing point, the switch 53 will be closed after a close time ΔX. In other words, current will be conducted through the load 6 with a time lag of close time ΔX after the control signal with the rising edge A is applied. The first conversion unit 2 will obtain the input sinusoid signal $V_{21}$ after the time lag of close time ΔX and provides the output signal $V_{22}$. The microprocessor 1 can calculate the actual close time ΔX by the time difference between the rising edge A of the control signal and a beginning time of the input sinusoid signal $V_{21}$ of the first conversion unit 2. The close time ΔX is then stored in a built-in memory unit (not shown) or a built-in register (not shown).

Similarly, the microprocessor 1 then sends a control signal (the falling edge B in the signal $V_{13}$) at a specific time point with a time lag Y to a previous zero-crossing point, when the switch 53 is closed (no matter the coil 53 is in energization or de-energization state). Therefore, the switch 50 will be opened after an open time ΔY after the falling edge B in the signal $V_{13}$. After the switch 50 is opened, the current is cut from the load 6 and the input end 21 of the first conversion unit 2 will stop inputting signal $V_{21}$. The microprocessor 1 can calculate the actual open time ΔY by the time difference between the falling edge B of the control signal and an ending time of the input sinusoid signal $V_{21}$ of the first conversion unit 2. The open time ΔY is then stored in a built-in memory unit (not shown) or a built-in register (not shown).

The measured open time and close time can be used for compensating the control operation of the relay 5. Provided that the half-cycle time of the AC power source is T (namely half period), the microprocessor 1 sends a control signal with a rising edge C at time (T−ΔX) after a previous zero-crossing point. The switch 50 can be precisely closed at a next zero-crossing point because the control signal is compensated by the close time ΔX, namely, $(T-\Delta X)+\Delta X=T$. Similarly, the microprocessor 1 sends a control signal with a falling edge D at time (T−ΔY) after a previous zero-crossing point. The switch 50 can be precisely opened at a next zero-crossing point because the control signal is compensated by the open time ΔY.

Figure 3:
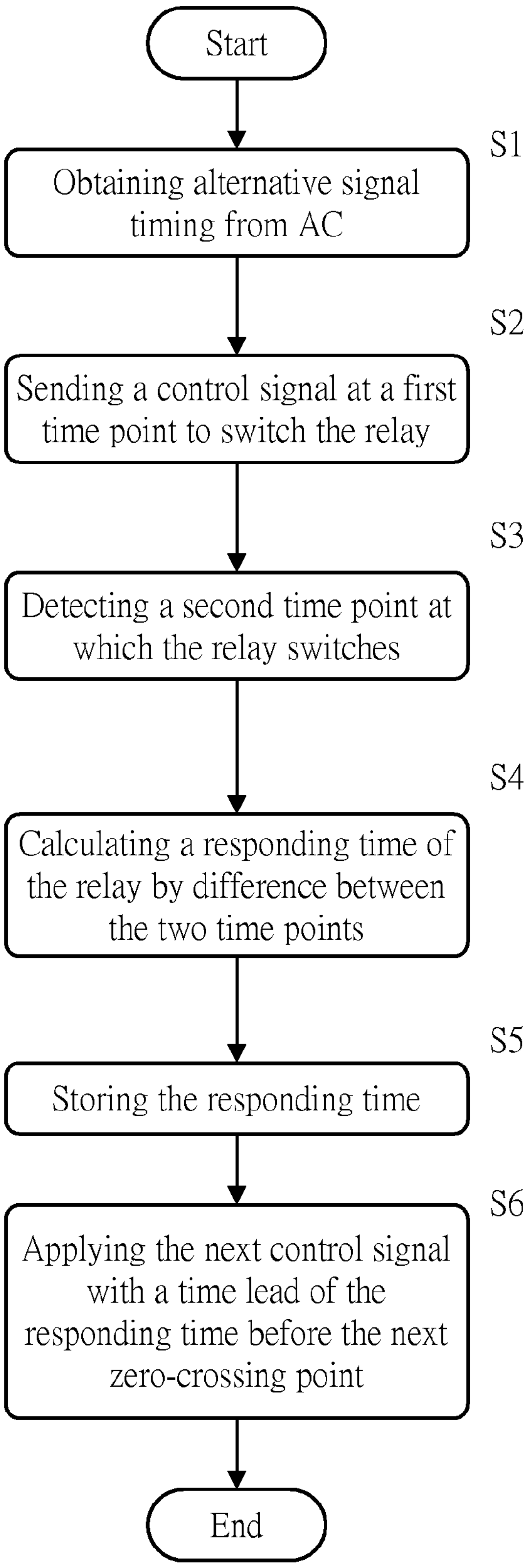
FIG. 3 shows a flowchart of the method for controlling open/close timing of relay according to the present invention.

FIG. 3 shows a flowchart of the method for controlling open/close timing of relay according to the present invention. The method can be implemented on a microprocessor to precisely switch a relay at zero-crossing point. An alternative signal timing is obtained from an AC power source in step S1. The microprocessor first sends a control signal to switch the relay at an arbitrary time point a in step S2. The microprocessor then detects an actual switch time of the relay at time point b in step S3. The microprocessor calculates the responding time of the relay by the difference in time points a and b in step S4 and stores the responding time of the relay in step S5. Afterward, the microprocessor will send next control signal with a time lead of the responding time before a next zero-crossing point in step S6 (namely with a time lag of half period subtracting the responding time after a previous zero-crossing point), thus achieving zero-crossing point switch for the relay.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A method for controlling open/close timing of a relay, the relay comprising a coil and at least one switch controlled by the coil and used to control a switching of an alternative current power source, the method comprising the steps of:

obtaining an alternative signal timing from the alternative current power source;

sending a control signal at a first time point to switch the relay to either of open and close states;

detecting a second time point at which the relay actually switches;

calculating a responding time of the relay by a difference between the first time point and the second time point; and applying the next control signal with a time lead of the responding time before a next zero-crossing point to actually switch the relay at a predetermined time point.

2. The method as in claim 1, wherein the predetermined time point is a zero-crossing point of the alternative current power source.

3. The method as in claim 1, wherein at least one step is performed by a microprocessor.

4. The method as in claim 1, wherein the responding time is one of a close time and an open time of the relay.

5. The method as in claim 1, wherein the alternative signal timing of the alternative current power source comprises the timing for each zero-crossing point.

6. A controlling apparatus for relay, comprising:

a relay comprising a coil and at least one switch controlled by the coil, the switch comprising at least a first contact and a second contact, wherein the first contact is electrically connected to one end of a load, the second contact is electrically connected to a hot line of an alternative current power source and another end of the load is electrically connected to a ground line of the power source;

a first conversion unit converting an input sinusoidal signal to a digitalized signal and comprising an input end connected to the first contact;

a second conversion unit converting an input sinusoidal signal to a digitalized signal and comprising an input end connected to the second contact; and a microprocessor operatively connected to the coil of the relay and sending a control signal to switch the relay to either of close and open states; the microprocessor comprising two input ends connected to an output end of the first conversion unit and an output end of the second conversion unit, respectively;

wherein the microprocessor obtains an alternative signal timing corresponding to the alternative current power source from the second conversion unit; the microprocessor sends a control signal at a first time point to switch the relay to either of open and close states; the microprocessor detects a second time point at which the relay actually switches, the microprocessor calculates a responding time of the relay by a difference between the first time point and the second time point; and the microprocessor applies the next control signal with a time lead of the responding time before a next zero-crossing point to actually switch the relay at a predetermined time point.

7. The controlling apparatus for relay as in claim 6, wherein the coil is electrically connected to an electronic switch and the electronic switch is controlled by the control signal of the microprocessor.

8. The controlling apparatus for relay as in claim 7, wherein the electronic switch is a transistor.

9. The controlling apparatus for relay as in claim 6, wherein the predetermined time point is a zero-crossing point of the alternative current power source.

10. The controlling apparatus for relay as in claim 6, wherein the responding time is one of a close time and an open time of the relay.

11. The controlling apparatus for relay as in claim 6, wherein the digitalized signal of the first conversion unit is a pulse signal.

12. The controlling apparatus for relay as in claim 6, wherein the digitalized signal of the second conversion unit is a pulse signal.

* * * * *